(12) United States Patent
Reddy

(10) Patent No.: US 7,065,145 B2
(45) Date of Patent: Jun. 20, 2006

(54) DIGITAL CARRIERLESS AMPLITUDE AND PHASE MODULATION (CAP) TRANSMITTER USING VECTOR ARITHMETIC STRUCTURE (VAS)

(75) Inventor: Ajit Kumar Reddy, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 804 days.

(21) Appl. No.: 09/874,876

(22) Filed: Jun. 5, 2001

(65) Prior Publication Data

US 2002/0181602 A1    Dec. 5, 2002

(51) Int. Cl.
*H04L 27/36* (2006.01)
*H04L 5/12* (2006.01)
(52) U.S. Cl. .................................. 375/261; 375/298
(58) Field of Classification Search ........ 375/259–261, 375/285, 242, 254, 298, 295
See application file for complete search history.

(56) References Cited

U.S. PATENT DOCUMENTS

| | | | | |
|---|---|---|---|---|
| 5,668,749 A | * | 9/1997 | Corleto et al. | 708/490 |
| 5,812,594 A | | 9/1998 | Rakib | 375/219 |
| 5,910,970 A | | 6/1999 | Lu | 375/377 |
| 5,930,299 A | * | 7/1999 | Vannatta et al. | 375/269 |
| 6,611,567 B1 | * | 8/2003 | Balakrishnan et al. | 375/298 |

* cited by examiner

*Primary Examiner*—Kevin Burd

(57) ABSTRACT

A method and apparatus for carrierless amplitude and phase CAP encoding of data in a manner avoiding the use of pulse shaping filters for in-phase and quadrature impulse signals. Specifically, in-phase and quadrature vector arithmetic structures (VAS) to adapt respective in-phase and quadrature impulse components to produce appropriate shaped in-phase and quadrature components.

12 Claims, 4 Drawing Sheets

300

DIGITAL CARRIERLESS AMPLITUDE AND PHASE MODULATION (CAP) TRANSMITTER USING VECTOR ARITHMETIC STRUCTURE (VAS)

TECHNICAL FIELD

The invention relates to the field of communications systems and, more specifically, a method and apparatus for carrierless amplitude and phase (CAP) encoding of data to be communicated over a communications network.

BACKGROUND OF THE INVENTION

Carrierless amplitude and phase (CAP) modulation is a coding technique based on quadrature amplitude modulation. In accordance with CAP, an impulse is generated which has two components, an in-phase signal and a corresponding quadrature signal. Each component may have an amplitude, which is equal to one of N different amplitude levels. By combining the two components, an impulse may be generated which has $N^2$ unique combinations of in-phase signal amplitude and quadrature signal amplitude.

FIG. 1 depicts a high level block diagram of a known CAP transmitter front end. Specifically, the CAP transmitter front end system 100 of FIG. 1 comprises a bit-to-symbol mapper 110, a differential encoder 120, a constellation mapper 130, an in-phase filter 140, a quadrature filter 150, a combiner 160 and an analog front end (AFE) 170. The cap transmitter front end 100 of FIG. 1 processes an input bit stream to produce a modulated transmission signal suitable for use by a transmitter back end (not shown).

The bit-to-symbol mapper 110 maps data words within the input bitstream to respective symbols. The differential encoder 120 differentially encodes the symbols. The constellation mapper 130 maps the differentially encoded symbols to a carrierless amplitude and phase (CAP) constellation. The constellation mapper 130 generates two orthogonal signals; namely, in-phase impulse component I and quadrature impulse component Q which together convey the information necessary to define the mapped symbols.

The in-phase filter 140 and quadrature filter 150 provide pulse shaping and passband modulation of, respectively, the in-phase I and quadrature Q impulse signals. The output of the filters 140 and 150 is then subtracted (or combined) by combiner 160 to form a modulated signal, that is processed by a digital-to-analog (D/A) converter (not shown) and other circuitry within the analog front and 170. It is noted that the D/A converter operates a sampling rate of 1/T'=i/T (where i is a suitable integer and 1/T is the symbol rate). The analog signal (Transmit Signal) obtained at the output of the AFE 170 is described by the following equation:

$$s(t) = \sum_{n=-\infty}^{n=\infty} [a_n p_{in}(t-nT) - b_n p_{qd}(t-nT)] \quad \text{(eq. 1)}$$

To obtain the output signal s(t), the in-phase 140 and quadrature 150 filters operate upon the upsampled input data by a factor of i. As known to those skilled in the art, upsampling of the input data may occur prior to filtering or within the filtering structure itself. The output of each of these N tap filters at the sampling rate is represented in equation (2) and (3) as follows.

$$FOUT_{inphase} = \sum_{k=0}^{N-1} a_n p_{in}(t-kT) \quad \text{(eq. 2)}$$

$$FOUT_{quadrature} = \sum_{k=0}^{N-1} b_n p_{qd}(t-kT) \quad \text{(eq. 3)}$$

Thus, to compute the filtered output for each given input sample for an N tap filter requires N multiplications and N-1 additions. The input to each of the filters for an M ary signal is ±(2p-1) for p=1 . . . M/2. Therefore the levels L=±1, ±3, ±5 . . . ±(2p-1). Unfortunately, such processing by the in-phase filter 140 and quadrature filter 150 requires significant processing power to achieve the large number of multiplication operations per relevant time period.

SUMMARY OF THE INVENTION

The present invention generally comprises a method and apparatus for carrierless amplitude and phase (CAP) encoding of data in a manner avoiding the use of pulse shaping filters for in-phase and quadrature impulse signals.

An encoder according to one embodiment of the invention comprises: a constellation generator, responsive to an input bitstream to produce an impulse comprising an in-phase component and a quadrature component, the impulse defining symbols within a constellation of symbols; a pair of vector arithmetic structures (VAS), each VAS adapting a respective one of the in-phase and quadrature components to produce respective shaped in-phase and quadrature components; and a combiner, for combining the shaped in-phase and quadrature components to produce an encoded bitstream.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The invention will be described within the context of a carrierless amplitude and phase (CAP) transmitter front end in which vector arithmetic structures (VAS) are used to perform pulse shaping functions previously performed with standard filter architectures. However, it is noted that methods and apparatus according to the invention are also applicable to other baseband and passband modulation schemes where pre-computed values may be stored in vector registers and recalled in response to received symbols.

Figure 2:
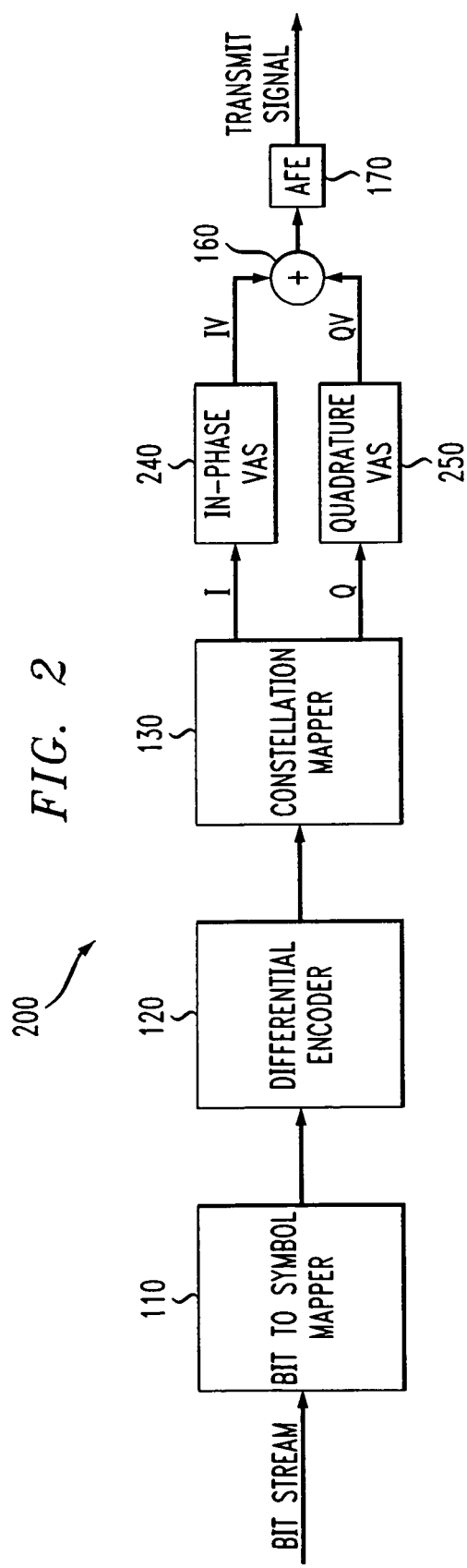
FIG. 2 depicts a high level diagram of a CAP transmitter front end according to an embodiment of the invention.

FIG. 2 depicts a high level block diagram of a CAP transmitter front end according to an embodiment of the invention. Specifically, the CAP transmitter front end system 200 of FIG. 2 comprises a bit-to-symbol mapper 110, a differential encoder 120, a constellation mapper 130, an in-phase vector arithmetic structure (VAS) 240, a quadrature VAS 250, a combiner 160 and an analog front end (AFE) 170.

The CAP transmitter front end 200 of FIG. 2 processes an input Bit Stream to produce a Transmit Signal suitable for transmission via a CAP transmitter back end (not shown).

Figure 1:
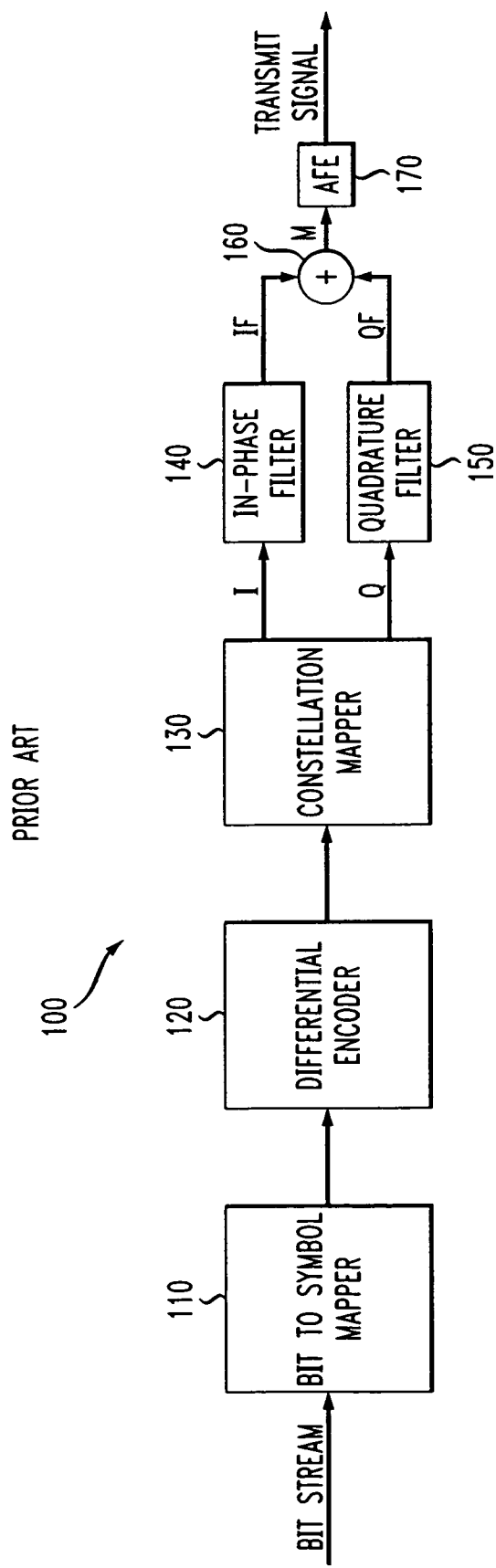
FIG. 1 depicts a high level block diagram of a known CAP transmitter front end.

The bit-to-symbol mapper 110, differential encoder 120, and constellation mapper 130 operate in the manner previously described with respect to corresponding elements of the known CAP transmitter front end 100 of FIG. 1.

The constellation mapper 130 of FIG. 2 generates two orthogonal signals; namely, an in-phase signal I and a quadrature signal Q. The in-phase I and quadrature Q signals are coupled to, respectively, an in-phase vector arithmetic structure (VAS) 240 and a quadrature VAS 250. The operation of the in-phase VAS 240 and quadrature VAS 250 will be described in more detail below with respect to FIG. 3. Briefly, the vector arithmetic structures 240 and 250 perform various pulse shaping and other processing functions to produce respective output signals for further processing by combiner 160 to form a modulated signal. Unlike the in-phase filter 140 and quadrature filter 150 of the system 100 of FIG. 1, the in-phase VAS 240 and quadrature VAS 250 of the system 200 of FIG. 2 do not use multiplication operations. Rather, the vector arithmetic structures 240 and 250 utilize addition and shift operations, thereby achieving a high level of computational efficiency. The vector arithmetic structure is architected in a manner adapted to the pulse shaping function to which it is applied. The specific architecture of an exemplary vector arithmetic structure will be discussed in more detail below with respect to FIG. 3.

In one embodiment of the invention, the bit-to-symbol mapper 110, differential encoder 120, and constellation mapper 130 produce a single output signal, such as a pulse code modulator (PCM) output signal. The single (e.g. PCN) output signal of the constellation mapper 130 is shaped by a single vector accumulator structure (VAS). In this embodiment, the combiner 160 is not needed.

Figure 3:
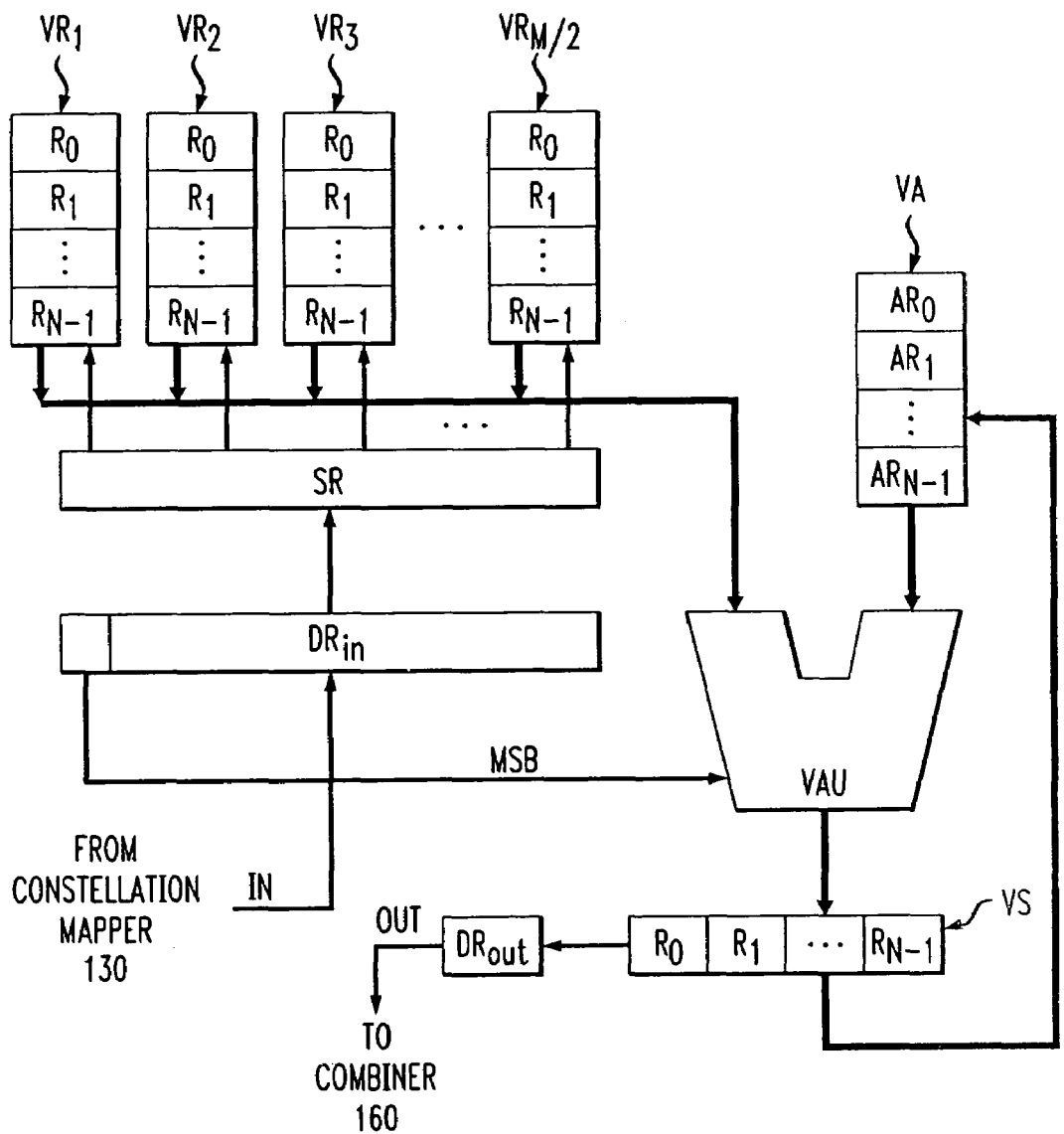
FIG. 3 depicts a high level block diagram of a vector arithmetic structure (VAS) suitable for use in the CAP transmitter front end of FIG. 2.

FIG. 3 depicts a high level block diagram of a vector arithmetic structure (VAS) suitable for use in the CAP transmitter front end of FIG. 2. The VAS 300 of FIG. 3 comprises a plurality of vector registers VR, a vector arithmetic unit (VAU), a vector shifter (VS), a vector accumulator (VA), a selector register (SR), an input data register ($DR_{in}$) and an output data register ($DR_{out}$). A first VAS 300 is used to implement the in-phase VAS 240 of the front end 200 of FIG. 2. A second VAS 300 is used to implement the quadrature VAS 250 of the system 200 of FIG. 2. It is noted that the in-phase VAS 240 and quadrature VAS 250 replace, respectively, the in-phase filter 140 and quadrature filter 150 of the system 100 of FIG. 1.

For purposes of this discussion, it is assumed that M positive levels may be represented collectively by the in-phase signal I and quadrature signal Q. Thus, each of the in-phase signals I and quadrature signals Q may have M/2 positive levels. Therefore, the VAS 300 of FIG. 3 utilizes M/2 vector registers, where each vector register VR has a vector size of N. The vector registers VR comprise an array of data registers of a predefined width (N), which depends upon the precision of the set of fixed point coefficients desired and upon the width of the input data received by the VAS 300.

The vector registers $VR_1$ through $VR_{M/2}$ are preferably read-only registers during normal or steady state operation of a CAP transmitter utilizing the VAS 300 of FIG. 3. The vector registers $VR_1$ through $VR_{M/2}$ are preferably initialized with pre-computed values during a power-on sequence. Optionally, the vector registers are initialized with pre-computed values by selecting a write mode via a control register (not shown). Optionally, in one embodiment of the invention, the vector registers are implemented using content addressable memory (CAM).

Each data word (i.e., an upsampled and encoded constellation symbol) to be processed by the VAS 300 is received from the constellation mapper 130 and stored in the input data register $DR_{in}$. It is noted that upsampling each encoded constellation symbol may occur within the constellation mapper, as a separate function between the constellation mapper and VAS, or as an input stage of the VAS. It is also noted that non-upsampled data may be utilized within the context of VAS. Preferably, the Most Significant Bit (MSB) of the data word stored within the input register $DR_{in}$ is coupled to the vector arithmetic unit VAU, which utilizes the MSB to determine whether an addition or subtraction operation is appropriate. The VAU operates as an adder if the MSB is in a first state, illustratively zero, or as a subtractor if the MSB is in a subtract (MSB) in a second state, illustratively one. Thus, the VAU selectively performs an addition operation or a subtraction operation using first and second input data words to produce an output data word.

The arithmetic result produced by the VAU is stored in the vector shifter VS and the vector accumulator VA. The vector shifter VS is capable of storing N data words, denoted as $R_0$ through $R_{N-1}$. It is noted that each of the vector registers VR is capable of storing N data words, denoted as RO through $R_{N-1}$. Moreover, the vector accumulator VA is capable of storing N words denoted as $AR_0$ through $AR_{N-1}$. The vector shifter performs a left shift operation to provide the $R_0$ word to the output register $DR_{OUT}$ for further processing by the combiner 160.

The remaining (i.e., non-MSB) bits of each data word within the input register $DR_{in}$ are stored in the selector register SR. The data stored within the selector register SR is used to index corresponding pre-computed values stored within the vector registers $VR_1$ through $VR_{M/2}$. Specifically, each non-MSB bit within the selector register SR has associated with it a corresponding vector register VR. Thus, depending upon the contents of the selector register SR, those vector registers VR associated with a non-MSB bit of a first state (e.g., a 1) provide their pre-computed values to a first input of the VAU. A second input of the VAU receives a previously accumulated vector from the vector accumulator VA. The VAU processes the previously accumulated vector and newly selected vector to produce a vector output which is stored in the vector shift register VS. The vector shift register provides the newly created vector to the vector accumulator VA and to the output register $DR_{out}$. The output register $DR_{out}$ provides an output word to the combiner 160 for further processing.

The vector accumulator VA is used to store previous outputs of the VAU, which previous outputs are retrieved from the vector shifter VS. Thus, in operation, the arithmetic function of the VAU is defined by the MSB of an input data word, while the pre-computed value associated with the input word is coupled to the first input of the VAU by selectively indexing a plurality of vector registers VR.

The VAS architecture described herein may be implemented using a Field Programmable Gate Array (FPGA) or on an Application Specific Integrated Circuit (ASIC). Advantageously, the VAS architecture not only provides low complexity in hardware implementation, but also provides higher clock speeds for a given "filter" size. It is noted that the invention may be implemented using a digital signal processor (DSP) having a vector unit and operating according to the principles described above with respect to FIGS. 2 through 4. A standard (i.e., non-vector) DSP may also be used to implement the invention, though a looped algorithm is required to perform the vector arithmetic functions. While overall execution time is increased using a regular DSP, such execution time is still less than a standard convolution operation where a filter structure is implemented, such as the filters 140 and 150 of the system 100 of FIG. 1.

Figure 4:
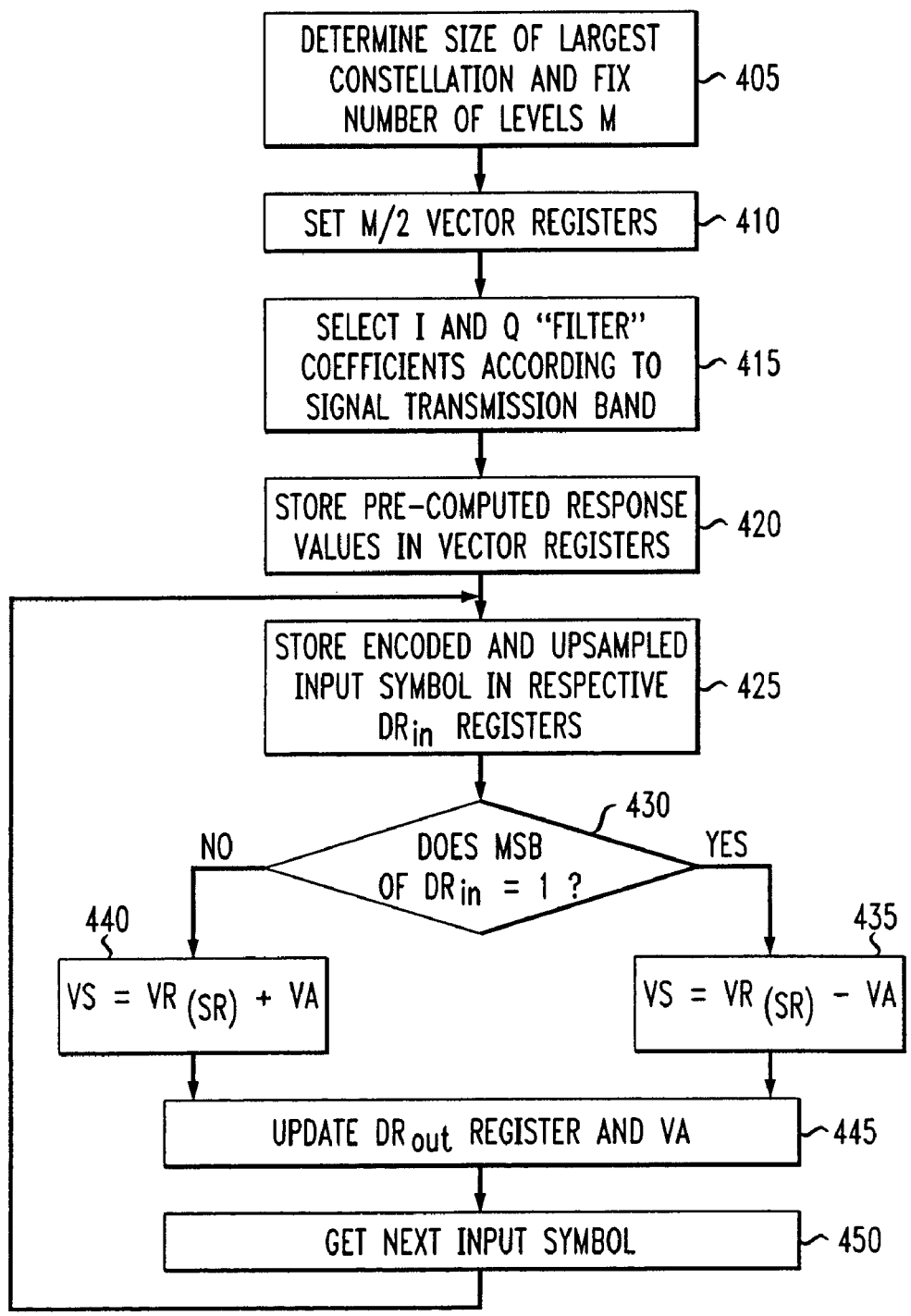
FIG. 4 depicts a flow diagram of a pulse shaping method suitable for use in implementing the VAS functions of FIGS. 2 and 3.

FIG. 4 depicts a flow diagram of a pulse shaping method suitable for use in implementing the VAS functions of FIG. 2. The method 400 is entered at step 405 where the size of the largest CAP constellation to be processed is determined, and the number of levels N is fixed.

At step 410, M/2 vector registers are set for each VAS. At step 415, in-phase I and quadrature Q "filter" coefficients are selected according to the signal transmission band to be employed. At step 420, pre-computed response values are stored in the M/2 vector registers associated with the in-phase VAS 240 and quadrature VAS 250 at step 410. At step 425, a first or next encoded and up sampled input symbol is stored in each of the in-phase and quadrature VAS data input registers $DR_{in}$.

At step 430, a determination is made as to whether the MSB of the stored input symbol is in a first state (illustratively a one) indicative of a desired arithmetic operation. If the query at step 430 is answered affirmatively, then the vector shift register VS is set equal to the difference between the selected pre-computed vector register responses and the accumulated vector samples within the vector accumulator VA. If the query at step 430 is answered negatively, then the vector shift register VS is set equal to the sum of the selected pre-computed vector register responses and the accumulated vector samples within the vector accumulator VA.

At step 445, the output register $DR_{OUT}$ and the vector accumulator VA are updated with the arithmetic result of the VAU operation depicted in steps 435 or 440. At step 450, the next input symbol is retrieved, and the method 400 proceeds to step 425. If the query at step 430 is answered affirmatively, then the vector shift register VS is set equal to the selected pre-computed vector register responses minus the accumulated vector samples within the vector accumulator VA.

According to the inventive method and apparatus, the use of multiplication (such as found in the filters 140, 150) is avoided. Moreover, since vector addition or subtraction is performed at the input data rate, the VAS architecture can be used at relatively high clock speeds.

While the invention has been primarily described within the context of a carrier amplitude and phase (CAP) encoder, it will be appreciated by those skilled in the art that the teachings of the invention may be applied to other environments. Specifically, the invention finds applicability within the context of other modulation schemes, such as quadrature amplitude modulation (QAM) and other known modulation schemes utilizing in-phase and quadruature signals. It should be noted that the invention is also applicable to one-dimensional modulation schemes, such as pulse code modulation (PCM). Further, while the invention is described within the context of a passband modulation scheme, i.e. CAP, the invention finds utility within the context of baseband modulation schemes, such as PCM. In general, the reactions of the subject invention may be used within the context of any modulation scheme typically implemented in a manner requiring significant multiplication operations. In such an environment, the arithmetic processing techniques utilized within the vector accumulator structure (VAS) or content addressable memory (CAM) advantageously to reduce the computational complexity necessary to implement the desired passband, baseband, one-dimensional or multi-dimensional modulation scheme.

While the foregoing is directed to the preferred embodiment of the present invention, other and further embodiments of the invention may be devised without departing from the basic scope thereof, and the scope thereof is determined by the claims that follow.

What is claimed is:

1. An encoder, comprising:
   a constellation generator, responsive to an input bitstream to produce an impulse comprising an in-phase component and a quadrature component, said impulse defining symbols within a constellation of symbols;
   a pair of vector arithmetic structures (VAS), each VAS adapting a respective one of said in-phase and quadrature components to produce respective shaped in-phase and quadrature components, wherein each VAS comprises:
      a plurality of vector registers (VR) for storing precomputed pulse shaping values; and
      a vector arithmetic unit (VAU) for arithmetically processing a selected vector and an accumulated vector, said selected vector comprising a plurality of precomputed values selected from said vector registers in response to a received component signal; and
   a combiner, for combining said shaped in-phase and quadrature components to produce an encoded bitstream.

2. The encoder of claim 1, wherein said output vector produced by said VAU is stored in an output buffer.

3. The encoder of claim 2, wherein said output vector produced by said VAU is stored in a vector accumulator (VA) for subsequent arithmetic processing.

4. The encoder of claim 3, wherein said VAU performs an addition operation in response to said received component signal having a most significant bit (MSB) of a first state, and a subtraction operation in response to said received component signal having a MSB of a second state.

5. The encoder of claim 1, wherein said constellation of symbols comprise carrierless amplitude and phase (CAP) symbols.

6. The encoder of claim 1, wherein said constellation of symbols comprise quadrature amplitude modulation (QAM) encoded symbols.

7. The encoder of claim 1, wherein each VAS processes a received component signal in a manner avoiding a multiplication operation.

8. The encoder of claim 1, wherein each VAS processes a received component signal in a manner implementing a filtering operation.

9. An encoding method, comprising:
   processing an input bitstream to produce an impulse defining symbols within a constellation of symbols, wherein said impulse comprises an in-phase component and a quadrature component;
   shaping, using a pair of respective vector arithmetic structures, said in-phase component and said quadrature component to produce respective shaped in-phase and quadrature components; and
   combining said shaped in-phase and quadrature components to produce an encoded bitstream;
   wherein, for each of said in-phase component and said quadrature component, said shaping comprises arithmetically processing a selected vector and an accumulated vector in response to receiving said respective component, said selected vector comprising a plurality of pre-computed pulse shaping values selected from a plurality of vector registers to impart a desired shape to said respective component.

10. The method of claim 9, wherein said arithmetically processed component is added to a vector accumulator for subsequent arithmetic processing.

11. The method of claim 10, wherein said arithmetic processing comprises an addition operation in response to said received component having a most significant bit (MSB) of a first state, and a subtraction operation in response to said received component having an MSB of a second state.

12. The method of claim 9, wherein said constellation of symbols comprises pulse code modulated (PCM) symbols.

* * * * *